United States Patent
Hui et al.

(10) Patent No.: US 11,424,683 B2
(45) Date of Patent: Aug. 23, 2022

(54) DARLINGTON TRANSISTOR DRIVE CIRCUIT, METHOD AND CONSTANT CURRENT SWITCHING POWER SUPPLY

(71) Applicant: FREMONT MICRO DEVICES CORPORATION, Guangdong (CN)

(72) Inventors: Kelvin Hui, Guangdong (CN); Chong Huang, Guangdong (CN); Yuquan Huang, Guangdong (CN)

(73) Assignee: FREMONT MICRO DEVICES CORPORATION, Shenzhen (CN)

( * ) Notice: Subject to any disclaimer, the term of this patent is extended or adjusted under 35 U.S.C. 154(b) by 0 days.

(21) Appl. No.: 17/270,430

(22) PCT Filed: Dec. 6, 2019

(86) PCT No.: PCT/CN2019/123764
§ 371 (c)(1),
(2) Date: Feb. 22, 2021

(87) PCT Pub. No.: WO2021/109145
PCT Pub. Date: Jun. 10, 2021

(65) Prior Publication Data
US 2022/0123657 A1    Apr. 21, 2022

(51) Int. Cl.
*H02M 3/335* (2006.01)
*H02M 1/44* (2007.01)
*H02M 1/00* (2006.01)
*H02M 1/088* (2006.01)

(52) U.S. Cl.
CPC ...... *H02M 3/33523* (2013.01); *H02M 1/0054* (2021.05); *H02M 1/088* (2013.01); *H02M 1/44* (2013.01)

(58) Field of Classification Search
CPC .......... H02M 3/33523; H02M 1/0054; H02M 1/088; H02M 1/44
See application file for complete search history.

(56) References Cited

U.S. PATENT DOCUMENTS

| | | | | |
|---|---|---|---|---|
| 4,104,714 A | * | 8/1978 | Smith | .......... H02M 3/335 363/124 |
| 4,106,084 A | * | 8/1978 | Gibert | ......... H02M 3/33507 363/21.02 |
| 4,130,101 A | * | 12/1978 | Jundt | ............ F02P 3/0556 315/209 T |

(Continued)

*Primary Examiner* — Yusef A Ahmed

(57) ABSTRACT

Disclosed are a Darlington transistor drive circuit, a Darlington transistor drive method implemented based on such Darlington transistor drive circuit, and a constant current switching power supply including such Darlington transistor drive circuit. The Darlington transistor drive circuit includes a drive current circuit, two switch units, and a drive control circuit used for controlling the two switch units to be switched off during the switching-on cycle of the Darlington transistor and to be switched on during a switching-off cycle of the Darlington transistor, and for changing an equivalent resistance of the two switch units at different stages during the switching- off cycle of the Darlington transistor. The switching-off time delay of the Darlington transistor is greatly reduced while achieving the EMI optimization. In additional, the switch loss of Darlington transistor is small when it is switched off, and the efficiency is improved.

8 Claims, 4 Drawing Sheets

(56) References Cited

U.S. PATENT DOCUMENTS

| | | | | |
|---|---|---|---|---|
| 4,315,303 A | * | 2/1982 | Snyder | H02M 3/33507 363/21.16 |
| 4,318,168 A | * | 3/1982 | Faxon | H03K 17/0826 363/21.16 |
| 4,329,725 A | * | 5/1982 | Hart | G05D 23/24 330/207 P |
| 4,434,779 A | * | 3/1984 | Yamamoto | F02P 3/0453 123/611 |
| 4,456,856 A | * | 6/1984 | Klinger | H03K 4/696 315/408 |
| 4,560,851 A | * | 12/1985 | Tsukamoto | H05B 6/062 219/625 |
| 4,654,544 A | * | 3/1987 | Wheeler | H03K 17/04126 327/512 |
| 6,979,933 B2 | * | 12/2005 | Oudshoorn | H02M 3/338 318/116 |
| 2001/0050595 A1 | * | 12/2001 | Komuro | H03F 3/3069 330/267 |
| 2013/0162303 A1 | * | 6/2013 | Dunipace | H02M 3/33523 327/109 |
| 2014/0146575 A1 | * | 5/2014 | Tse | H02M 3/335 363/20 |
| 2014/0293664 A1 | * | 10/2014 | Dai | H03K 17/162 363/44 |
| 2018/0337527 A1 | * | 11/2018 | Kovatchev | H03K 17/687 |
| 2022/0029615 A1 | * | 1/2022 | Lyu | H03K 17/04113 |

* cited by examiner

DARLINGTON TRANSISTOR DRIVE CIRCUIT, METHOD AND CONSTANT CURRENT SWITCHING POWER SUPPLY

TECHNICAL FIELD

The present disclosure relates generally to a power supply technical field, and more particularly relates to a Darlington transistor drive circuit, a Darlington transistor drive method, and a constant current switching power supply.

BACKGROUND

FIG. 1 has shown an existing Darlington transistor drive circuit, which comprises a drive control circuit, a control switch K1, a switch tube K2 and a drive current source. In which, the drive control circuit controls the switching-on and switching-off of the Darlington transistor by switching on or off the control switch K1 and the switch tube K2. Combining with FIG. 2, in which Vs represents the voltage of the resistor Rs, Vc represents the voltage at the terminal C, R2 represents the equivalent resistance of the switch tube K2, while Ib represents the drive current outputted by the drive current source. When the Darlington transistor needs to be switched on, the drive control circuit controls the switch tube K2 to be switched off and the control switch K1 to be switched on, thus inputting the drive current to the drive pin of the Darlington transistor. The drive current of the Darlington transistor is Ib0. At this time, the collector and emitter of the Darlington transistor are positively biased, and the Darlington transistor is switched on. When the Darlington transistor needs to be switched off, the drive current is 0, and the drive control circuit controls the switch tube K2 to be switched on and the control switch K1 to be switched off.

At present, the problem is that when the Darlington transistor is switched off, due to the switching-off delay characteristic of the NPN transistor of the Darlington transistor, just the collector charge and emitter charge are discharged from the terminal B1, while the charges between the terminal B2 and the collector remain. Accordingly, the existing scheme has a too long time delay, and there is a large switch loss for the NPN transistor of the Darlington transistor. In additional, when the Darlington transistor is switched on, the current gain is very large and the Darlington transistor would be switched on quickly. Therefore, when the Darlington transistor is switched on, it will cause a large EMI interference, which is reflected in the initial stage of the RS voltage as a large overshoot.

SUMMARY

The present disclosure has provided a Darlington transistor drive circuit, a Darlington transistor drive method, and a constant current switching power supply, aiming at the above mentioned defects.

According to an aspect, a Darlington transistor drive circuit is provided, which comprising:

a drive current circuit connected to a drive pin of a Darlington transistor, used for outputting an output current to the drive pin of the Darlington transistor during a switching-on cycle of the Darlington transistor;

two switch units respectively connected between drive terminals of two transistors of the Darlington transistor and ground;

a drive control circuit connected with the two switch units, used for controlling the two switch units to be switched off during the switching-on cycle of the Darlington transistor and to be switched on during a switching-off cycle of the Darlington transistor, and for changing an equivalent resistance of the two switch units at different stages during the switching-off cycle of the Darlington transistor; wherein each switch unit has a first equivalent resistance in a first stage of the switching-off cycle which is smaller than a second equivalent resistance in a second stage of the switching-off cycle but greater than a third equivalent resistance in a third stage of the switching-off cycle.

Preferably, the two switch units are respectively composed of a plurality of switch tubes connected in parallel, and the drive control circuit can control a state of each switch tube for defining the equivalent resistance of each switch unit by controlling a number of the switch tubes which are switched on in each switch unit.

Preferably, the switch tube is an NPN-type MOS tube.

Preferably, the drive current circuit is connected with the drive control circuit for controlling the output current to gradually increase to a stable value required by the Darlington transistor, and then maintaining the stable value during the switching-on cycle.

Preferably, the output current of the drive current circuit increases from a current value I0 to a current value I1 in the first stage of the switching-on cycle and then enters the second stage of the switching-on cycle after reaching the current value I1, then increases from the current value I1 to a current value I2 in the second stage of the switching-on cycle, and then enters the third stage of the switching-on cycle after reaching the current value I2, and maintains at the current value I2 during the third stage of the switching-on cycle; wherein a current increase rate of the first stage is less than that of the second stage.

According to a second aspect, a constant current switching power supply is provided, which comprising an input circuit, an output circuit, a transformer and the Darlington transistor drive circuit discussed above; wherein a primary input terminal of the transformer is connected to the input circuit, the Darlington transistor is arranged between a primary output end of the transformer and ground, the output circuit is connected to a secondary side of the transformer.

According to a third aspect, a Darlington transistor drive method implemented based on the Darlington transistor drive circuit discussed above is provided, which comprising implementing following steps repeatedly:

controlling the two switch units to be switched off during the switching-on cycle of the Darlington transistor by the drive control circuit;

controlling the two switch units to be switched on during the switching-off cycle of the Darlington transistor and changing an equivalent resistance of the two switch units at different stages during the switching-off cycle of the Darlington transistor by the drive control circuit; wherein each switch unit has a first equivalent resistance in a first stage of the switching-off cycle which is smaller than a second equivalent resistance in a second stage of the switching-off cycle but greater than a third equivalent resistance in a third stage of the switching-off cycle.

Preferably, the two switch units are respectively composed of a plurality of switch tubes connected in parallel, and the Darlington transistor drive method further comprises defining the equivalent resistance of each switch unit by controlling a number of the switch tubes which are switched on in each switch unit by the drive control circuit.

Preferably, the Darlington transistor drive method further comprises controlling the output current to gradually increase to a stable value required by the Darlington transistor, and then maintaining the stable value during the switching-on cycle, which further comprises:

increasing the output current of the drive current circuit from a current value I0 to a current value I1 in the first stage of the switching-on cycle;

entering the second stage of the switching-on cycle after the output current reaches the current value I1, and then increasing the output current from the current value I1 to a current value I2 in the second stage of the switching-on cycle, wherein a current increase rate of the first stage is less than that of the second stage;

entering the third stage of the switching-on cycle after the output current reaches the current value I2, and maintaining the output current at the current value I2 during the third stage of the switching-on cycle.

The Darlington transistor drive circuit, a Darlington transistor drive method, and a constant current switching power supply of the present disclosure has following technical effects. When the Darlington transistor is switched off, the equivalent resistances of the two switch units are defined differently in the different stages. Each switch unit has a first equivalent resistance in a first stage which is smaller than a second equivalent resistance in a second stage but greater than a third equivalent resistance in a third stage. In such a way, before entering the final third stage, the time delay and switch loss can be reduced in the first stage and the EMI can be improved in the second stage. In additional, the output current is controlled to gradually increase to a stable value required by the Darlington transistor, and then is maintained the stable value during the switching-on cycle, so the EMI problem caused by the switching-on of the Darlington transistor can be improved. In a word, the switching-off time delay of the Darlington transistor is greatly reduced while achieving the EMI optimization. In additional, the switch loss of Darlington transistor is small when it is switched off, and the efficiency is improved.

BRIEF DESCRIPTION OF THE DRAWINGS

In order to illustrate the embodiments of the present disclosure or the technical solutions in the prior art more clearly, the drawings needed in the description of the embodiments or the prior art will be briefly introduced. It is obvious that the drawings in the following description are only the embodiments of the present disclosure, and for one skilled in the art, other drawings can be obtained from the following attached drawings without paying creative labor.

DETAILED DESCRIPTION OF THE PREFERRED EMBODIMENT

Figure 1:
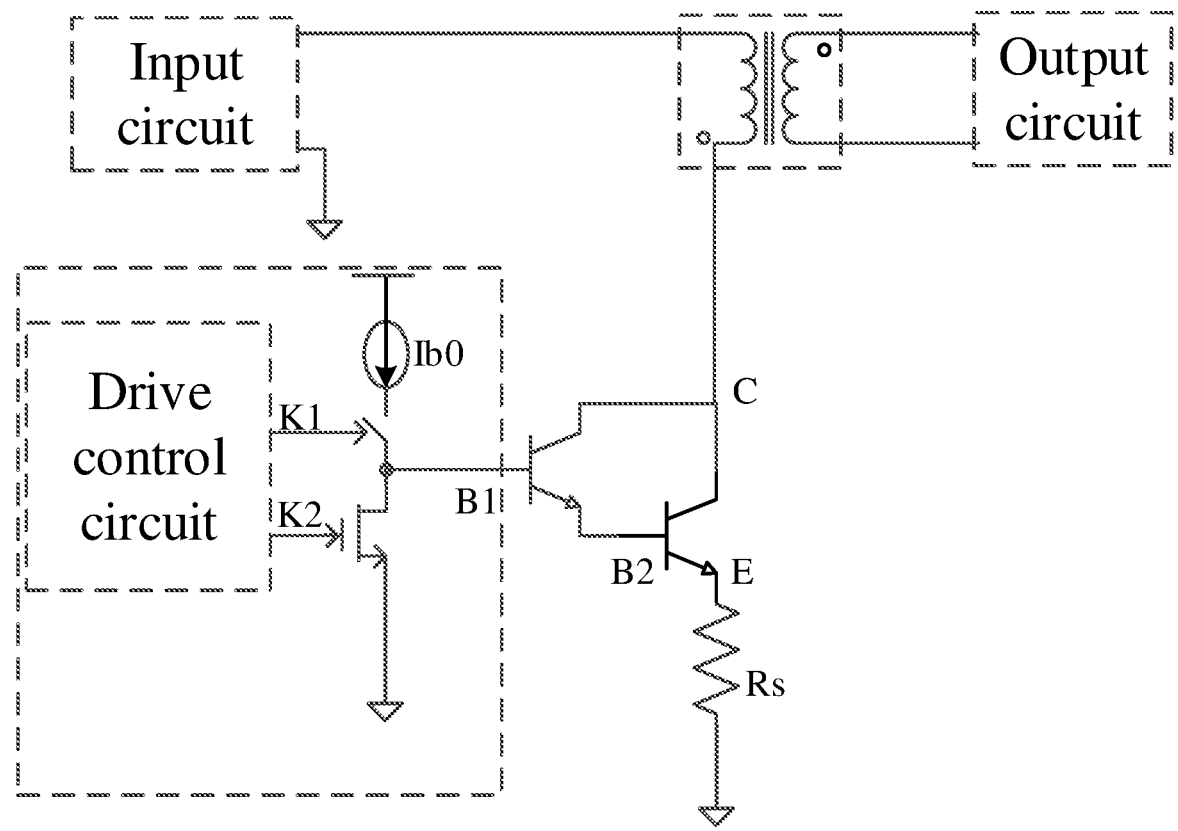
FIG. 1 is a circuit diagram of a prior Darlington transistor drive circuit.
Figure 2:
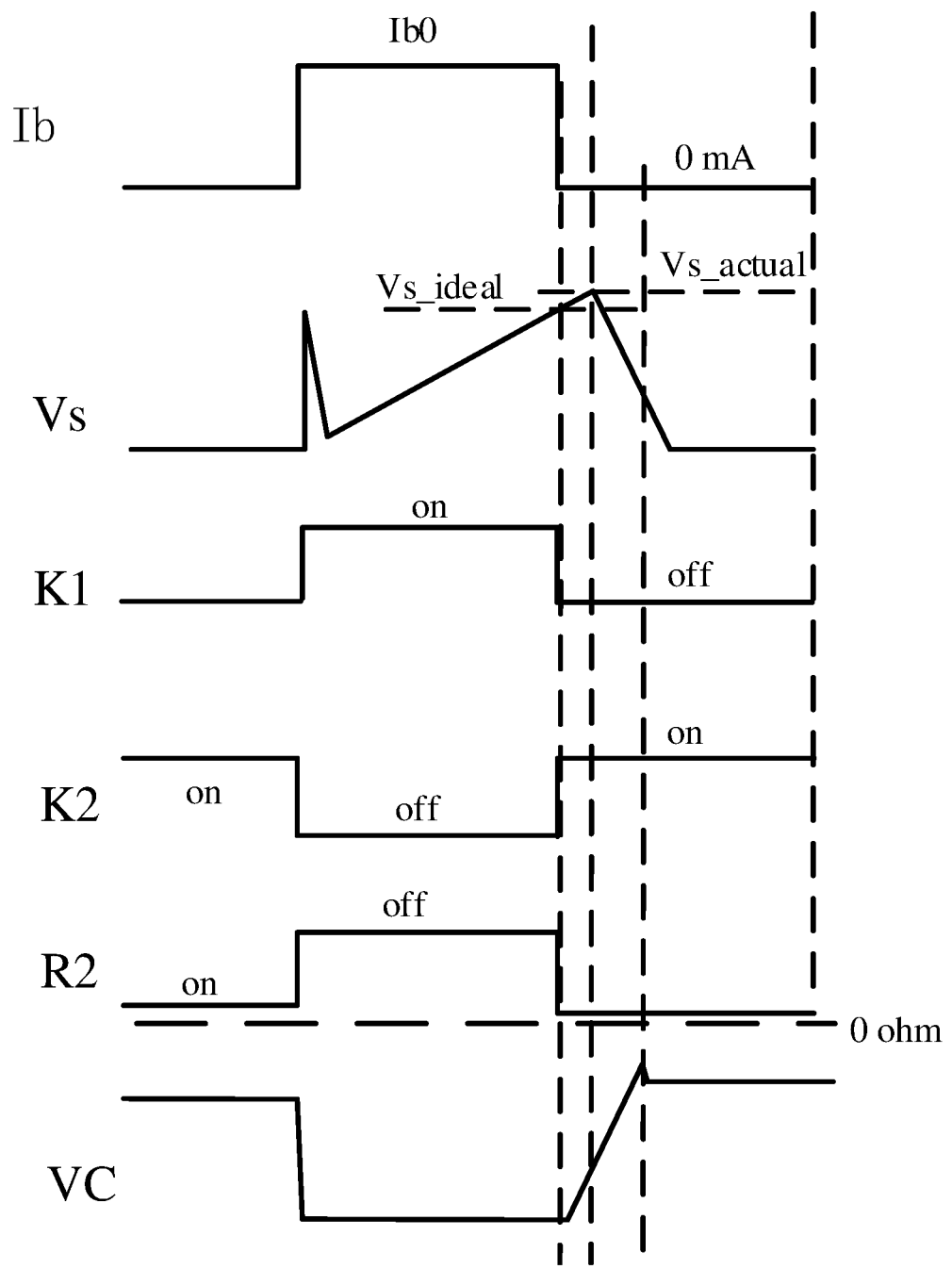
FIG. 2 is the key operation waveform of the prior Darlington transistor drive circuit.

In order to facilitate the understanding of the present disclosure, a more comprehensive description of the present disclosure will be given as follows with reference to the relevant drawings. Typical embodiments of the present disclosure are shown in the drawings. However, the present disclosure can be implemented in many different forms and is not limited to the embodiments described herein. On the contrary, the purpose of providing these embodiments is to make the description of the present disclosure more thorough and comprehensive.

Unless otherwise defined, all technical and scientific terms used herein have the same meanings as those commonly understood by one skilled in the art of the present disclosure. The terms used in the description of the present disclosure are only for the purpose of describing specific embodiments, and are not intended to limit the present disclosure.

The terms "first", "second" and other ordinal numbers used in this specification can be used to describe but not limit the various constituent elements. The purpose of using these terms is to distinguish one constituent element from the other. For example, without departing from the scope of the present disclosure, the first constituent element can be named as the second constituent element, and similarly, the second constituent element can also be named as the first constituent element. The "connect with" or "connect to" mentioned herein not only includes the direct connection of two entities, but also includes the indirect connection through other entities with beneficial improvement effect.

The general concept of the present disclosure is as follows. Two switch units are respectively connected between the drive terminals of the two transistors of the Darlington transistor and the ground, the switching-on and switching-off of the Darlington transistor are controlled by controlling the state of the two switch units. In additional, the equivalent resistances of the two switch units are defined to change at different stages during the switching-off cycle of the Darlington transistor, and each switch unit has a first equivalent resistance in a first stage which is smaller than a second equivalent resistance in a second stage but greater than a third equivalent resistance in a third stage. In such a way, the time delay and switch loss can be reduced during the switching-off of the Darlington transistor, and the EMI problem caused by the switching-on of the Darlington transistor can be improved. In additional, the drive current circuit can be replaced by a dynamic variable current source, so that the output current can be gradually increased to the required stable value of the Darlington transistor and then maintained at the stable value during the switching-on cycle of the Darlington transistor, thus improving the EMI when the Darlington transistor is switched on.

In order to better understand the above technical scheme, the above technical scheme will be described in detail in combination with the drawings of the specification and the specific embodiments. It should be understood that the embodiment of the present disclosure and the specific features in the embodiment are the detailed description of the technical scheme of the present disclosure, not the limitation of the technical scheme of the present disclosure. In the case of no conflict, the embodiment of the present disclosure and the technical features in the embodiment can be combined with each other.

Figure 3:
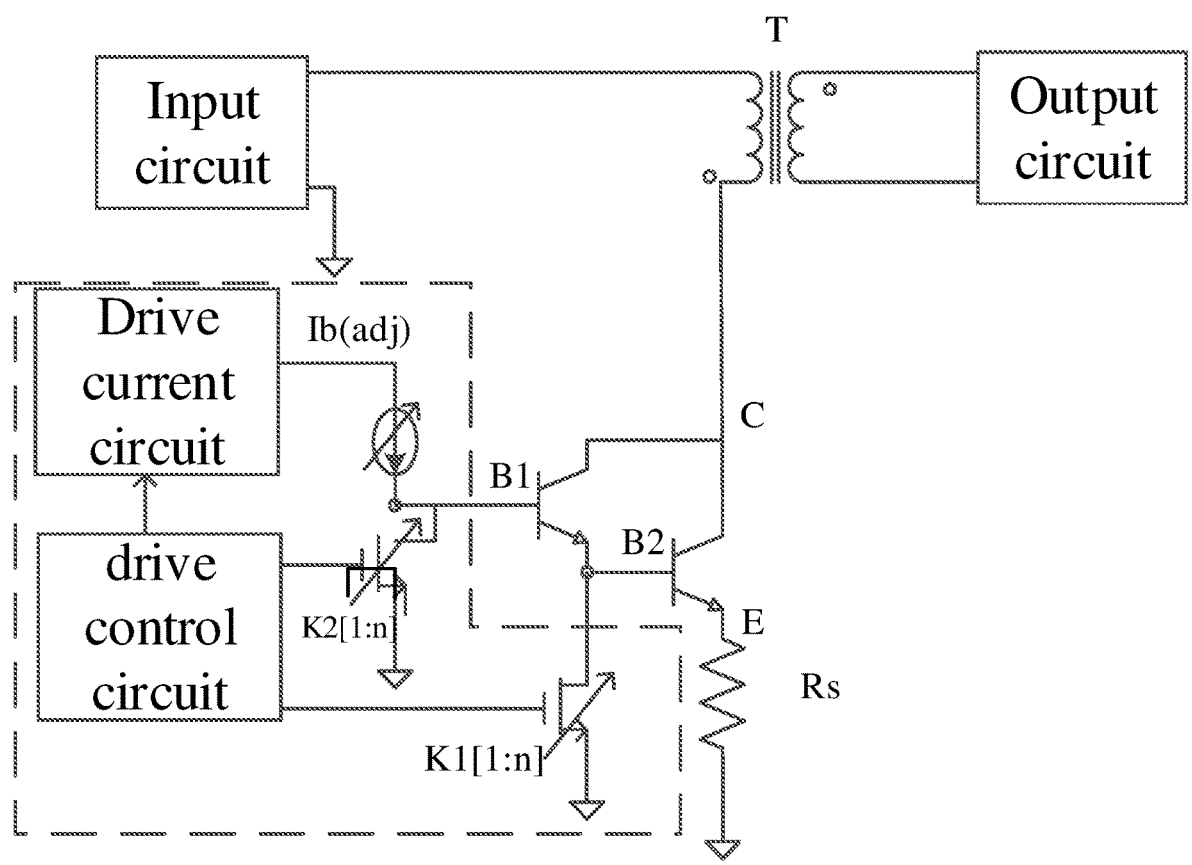
FIG. 3 is a circuit diagram of a Darlington transistor drive circuit according to an embodiment of the present disclosure.

Referring FIG. 3, the Darlington transistor is composed of two NPN transistors. In the FIG. 3, B1 and B2 represent the drive terminals (that is, the base) of the two transistors and B1 is used as the drive pin of the whole Darlington transistor. In the FIG. 3, C represents the input pin of the whole Darlington transistor, while E represents the output pin of the whole Darlington transistor. The Darlington transistor drive circuit of the present disclosure is mainly used for driving the periodical switching-on and switching-off of the Darlington transistor, so as to realize the constant current effect. Specifically, when the Darlington transistor is switched on, the primary side of the transformer T stores energy, and when the Darlington transistor is switched off, the energy of the primary side is transferred to the secondary side of the transformer T and then converted to the output terminal.

The Darlington transistor drive circuit of the present disclosure comprises a drive current circuit, two switch units and a drive control circuit. The drive current circuit and the two switch units are respectively connected to the drive control circuit.

Specifically, the two switch units are respectively connected between the drive terminals of the two transistors of the Darlington transistor and the ground. The two switch units are respectively composed of a plurality of switch tubes connected in parallel. Herein, the so-called plurality of switch tubes refer to two or more switch tubes. The switch tube is preferably a NP-type MOS tube.

The parallel connection of the switch tubes refers to that the control terminals of the switch tubes are connected together, the input terminals of the switch tubes are connected together, and the output terminals of the switch tubes are connected together, respectively. As shown in FIG. 3, the switch unit between the drive terminal B1 and the ground is composed of N switch tubes, where N≥2, K1 [1: N] represents the all N switch tubes in the switch unit between the drive terminal B1 and the ground. Only one switch tube is shown in the figure, and the connection relationships of other switch tubes are the same as it, and are consequently omitted. Similarly, K2 [1: N] in the FIG. 3 represents all N switch tubes in the switch unit between the drive terminal B2 and the ground. Only one switch tube is shown in the figure, and the connection relationships of other switch tubes are the same as it, and are consequently omitted.

Figure 4:
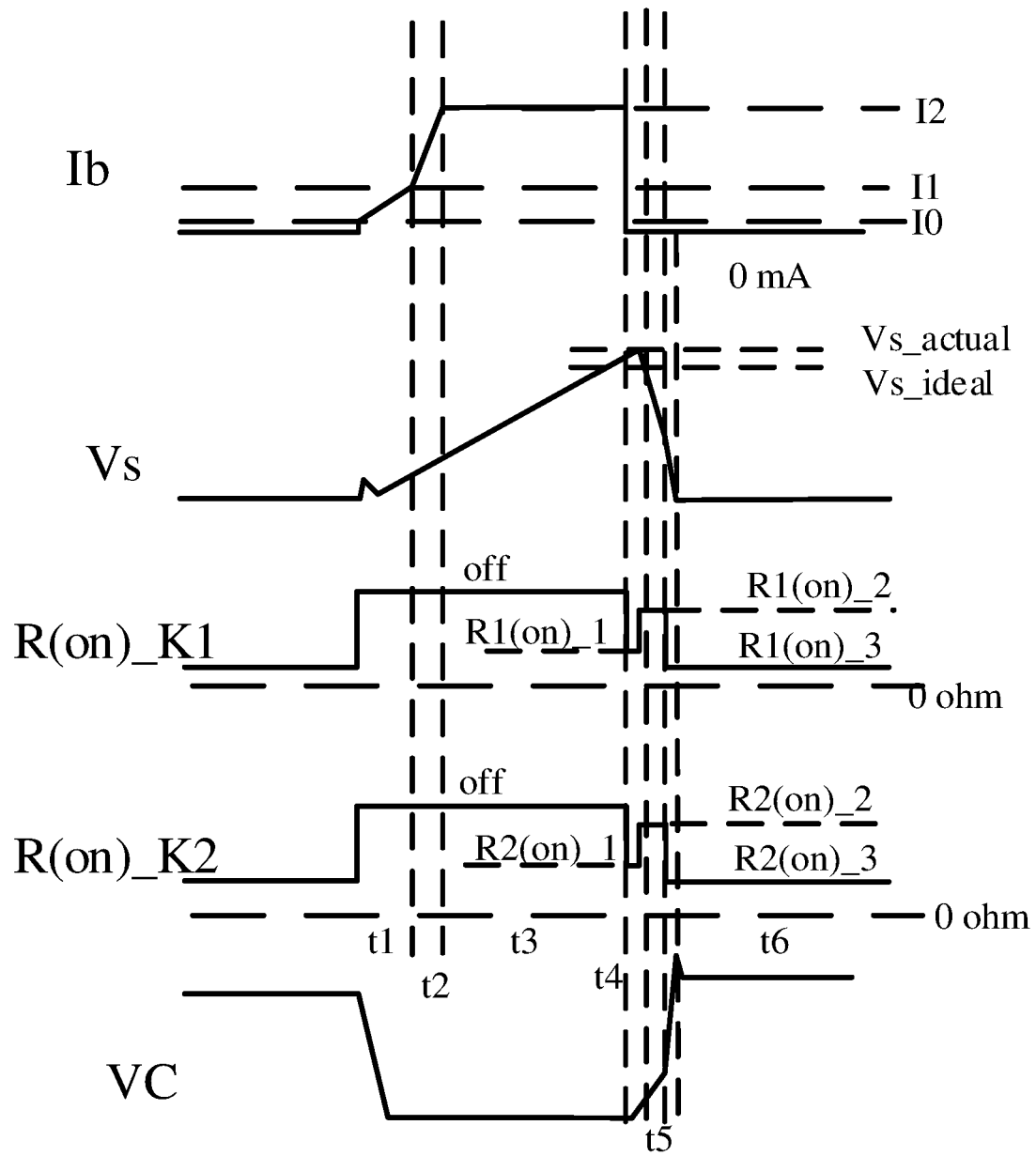
FIG. 4 is the key operation waveform of the Darlington transistor drive circuit according to an embodiment of the present disclosure.

Specifically, the drive control circuit is connected to each switch tube in the two switch units. Referring to FIG. 4, the drive control circuit controls the two switch units to be switched off during the switching-on cycle of the Darlington transistor (that is, the cycle in which the Darlington transistor is conducted) and to be switched on during a switching-off cycle of the Darlington transistor (that is the cycle in which the Darlington transistor is disconnected). As one switch unit comprises a plurality of switch tubes connected in parallel, the whole switch unit is switched off only when all the switch tubes in the switch unit are switched off. Similarly, as one switch unit comprises a plurality of switch tubes connected in parallel, the whole switch unit is switched on only if one switch tube in the switch unit is switched on.

Referring to FIG. 4, in the present disclosure, the equivalent resistances of the two switch units are defined to change at different stages during the switching-off cycle of the Darlington transistor. Specifically, the switching-off cycle of the Darlington transistor is divided into three stages of t4, t5 and t6, as shown in FIG. 4. The equivalent resistance of each switch unit in the first stage (i.e. t4 stage) of the switching-off cycle is smaller than that in the second stage (i.e. t5 stage) but greater than that in the third stage (i.e. t6 stage). Obviously, because each switch unit has a conductive resistance when it is switched on, the equivalent resistance of the whole switch unit is the parallel equivalent resistance of the conductive resistances of all the switch tubes which are switched on. As the drive control circuit can control the state of each switch tube separately, the drive control circuit can define the equivalent resistance of each switch unit by controlling the number of the switch tubes which are switched on in each switch unit. Obviously, the greater the number of the switch tubes which are switched on in each switch unit, the smaller the equivalent resistance of the switch unit. On the contrary, the smaller the number of the switch tubes which are switched on in each switch unit, the greater the equivalent resistance of the switch unit. In the present disclosure, the equivalent resistance of the switch unit is the minimum in the t6 stage, as the drive control circuit controls all the switch tubes in each switch unit to be switched on.

Specifically, the drive current circuit is connected to the drive pin of the Darlington transistor and used to output an output current to the drive pin of the Darlington transistor during the switching-on cycle of the Darlington transistor. Preferably, in order to improve the EMI when the Darlington transistor is switched on, the drive current circuit controls the output current to gradually increase to a stable value required by the Darlington transistor during the switching-on cycle of the Darlington transistor and then maintains the stable value. Specifically, referring to FIG. 4, the output current of the drive current circuit increases from the current value I0 to the current value I1 in the first stage of the switching-on cycle (i.e. t1 stage), and then enters the second stage (i.e. t2 stage) after reaching the current value I1, then increases from the current value I1 to a current value I2 in the second stage of the switching-on cycle, and then enters the third stage (i.e. t3 stage) of the switching-on cycle after reaching the current value I2 and maintains at the current value I2 during the third stage of the switching-on cycle. Among them, the current increase rate of the first stage is less than that of the second stage.

The operation principle of the present disclosure will be described in detail with reference to FIG. 4. In which, R (on)_K1 represents the equivalent resistance of the switch unit between the drive terminal B1 and the ground, R(on)_K2 represents the equivalent resistance of the switch unit between the drive terminal B2 and ground, Vs represents the voltage on the resistor Rs, Vc represents the input voltage of Darlington transistor, i.e. the C-terminal voltage, and Ib represents the drive current.

1) When the Darlington transistor is switched on, the switch tube sequence K1 [1: N], K2 [1: N] are transformed from the switching-on state to the switching-off state (wherein N≥2). The dynamic drive current circuit generates the output current Ib (adj), which flows into the drive terminal B1 of the Darlington transistor. The based and collector junction, and the base and emitter junction of the Darlington transistor are positively biased, and the Darlington transistor is switched on. The initial drive current has a current value I0 when the Darlington transistor is switched on. After t1 time, the drive current has increased from the current value I0 to the current value I1. After t2 time, the drive current has increased from the current value I1 to the current value I2. During the switching-on period of the Darlington transistor, the drive current circuit generates the variable drive current Ib (adj). The smoothly changed drive current drives the Darlington transistor. The EMI problem caused by the switching-on of the Darlington transistor can be improved by changing the current increase rate and value of the dynamic drive current in different time stages. When the Darlington transistor is switched on, there is a small overshoot on the resistor Rs. When the Darlington transistor has been switched on, the base and collector junction is reverse biased, while the base and emitter junction is positive biased. Thus, here is a current flowing through the resistor Rs from the collector through the multiplier amplification of the Darlington transistor.

2) When the Darlington transistor is switched off, the drive current circuit turns off the drive current Ib (adj), that is, Ib (adj) is 0. The equivalent resistances of the switch units between the drive terminal B1 and the ground and between the drive terminal B2 and the ground at different stages are adjusted by controlling the number of the switch tubes which are switched on in the switch tube sequence K1 [1: N] and the switch tube sequence K2 [1: N] at different stages through the switch signal. Specifically, in t4 stage, the equivalent resistance R(on)_K1 of the switch tube sequence K1 [1: N] between the drive terminal B1 and the ground and the equivalent resistance R(on)_K2 of the switch tube sequence K2 [1: N] between the drive terminal B2 and the ground are arranged as R1(on)_1 and R2(on)_1, respectively. As the Darlington transistor has the base and collector junction capacitance, when it is switched off, the Darlington transistor has the Miller effect, so the equivalent resistance R(on)_K1 of the switch tube sequence K1 [1: N] and the equivalent resistance R(on)_K2 of the switch tube sequence K2[1: N] are arranged as R1 (on)_2 and R2 (on)_2; wherein R2 (on)_2≥R2(on)_1, R1(on)_2 >≥R1(on)_1 during the t5 stage. In such a way, the time delay and switch loss can be reduced at the t4 stage, and the EMI problem can be solved at the t5 stage. During the switching-off stage of the Darlington transistor, the miller effect ends at the t6 stage. The equivalent resistance R(on)_K1 of the switch tube sequence K1 [1: N] and the equivalent resistance R(on)_K2 of the switch tube sequence K2 [1: N] are arranged as R1 (on)_3 and R2 (on)_3; wherein R2 (on)_1>R2(on)_3, R1(on)_1≥R1 (on)_3. In this way, a better switching-off time delay and EMI characteristic can be achieved by arranging different pull-down resistances at the drive terminal B1 and drive terminal B2. In this way, the Darlington transistor drive circuit of the present disclosure has better EMI characteristics, reduced switching-off time delay, optimized efficiency, and a wide applicability.

Based on the same inventive concept, the present disclosure has further requested to protect a constant current switching power supply, which comprises an input circuit, an output circuit, a transformer and the Darlington transistor drive circuit discussed above; wherein a primary input terminal of the transformer is connected to the input circuit, the Darlington transistor is arranged between a primary output end of the transformer and ground, the output circuit is connected to a secondary side of the transformer. When the Darlington transistor is switched off, the energy of the primary side is transferred to the secondary side of the transformer T and then converted to the output terminal.

Based on the same inventive concept, the present disclosure has further requested to protect a Darlington transistor drive method implemented based on the Darlington transistor drive circuit discussed above, which comprising implementing following steps repeatedly:

S1, controlling the two switch units to be switched off during the switching-on cycle of the Darlington transistor by the drive control circuit;

S2, controlling the two switch units to be switched on during a switching-off cycle of the Darlington transistor and changing an equivalent resistance of the two switch units at different stages during the switching-off cycle of the Darlington transistor by the drive control circuit; wherein each switch unit has a first equivalent resistance in a first stage of the switching-off cycle which is smaller than a second equivalent resistance in a second stage of the switching-off cycle but greater than a third equivalent resistance in a third stage of the switching-off cycle.

Wherein, the two switch units are respectively composed of a plurality of switch tubes connected in parallel, and the Darlington transistor drive method further comprises defining the equivalent resistance of each switch unit by controlling a number of the switch tubes which are switched on in each switch unit by the drive control circuit. Preferably, the Darlington transistor drive method further comprises controlling the output current to gradually increase to a stable value required by the Darlington transistor, and then maintaining the stable value during the switching-on cycle. To be specific, the output current increases from a current value I0 to a current value I1 in the first stage of the switching-on cycle and then enters the second stage of the switching-on cycle after reaching the current value I1, then increases from the current value I1 to a current value I2 in the second stage of the switching-on cycle, and then enters the third stage of the switching-on cycle after reaching the current value I2, and maintains at the current value I2 during the third stage of the switching-on cycle. Wherein a current increase rate of the first stage is less than that of the second stage.

For more information, please refer to the above circuit embodiment, which will not be repeated here.

The Darlington transistor drive circuit, a Darlington transistor drive method, and a constant current switching power supply of the present disclosure has following technical effects. When the Darlington transistor is switched off, the equivalent resistances of the two switch units are defined different in the different stages. Each switch unit has a first equivalent resistance in a first stage which is smaller than a second equivalent resistance in a second stage but greater than a third equivalent resistance in a third stage. In such a way, before entering the final third stage, the time delay and switch loss can be reduced in the first stage and the EMI can be improved in the second stage. In additional, the output current is controlled to gradually increase to a stable value required by the Darlington transistor, and then is maintained the stable value during the switching-on cycle, so the EMI problem caused by the switching-on of the Darlington transistor can be improved. In a word, the switching-off time delay of the Darlington transistor is greatly reduced while achieving the EMI optimization. In additional, the switch loss of Darlington transistor is small when it is switched off, and the efficiency is improved.

The embodiments of the present disclosure are described above in combination with the drawings, but the present disclosure is not limited to the above specific embodiments. The above specific embodiments are only schematic, not restrictive. Ordinary technicians in the art can make many forms under the enlightenment of the present disclosure and without departing from the scope of the purpose and claims of the present disclosure, and these are within the protection of the present disclosure.

The invention claimed is:

1. A Darlington transistor drive circuit comprising:
a drive current circuit connected to a drive pin of a Darlington transistor, used for outputting an output current to the drive pin of the Darlington transistor during a switching-on cycle of the Darlington transistor;
two switch units respectively connected between drive terminals of two transistors of the Darlington transistor and ground; and
a drive control circuit connected with the two switch units, used for controlling the two switch units to be switched off during the switching-on cycle of the Darlington transistor and to be switched on during a switching-off cycle of the Darlington transistor, and for changing an equivalent resistance of the two switch units at different stages during the switching-off cycle of the Darlington transistor; wherein each switch unit of the two switch units has a first equivalent resistance in a first stage of the switching-off cycle which is smaller than a second equivalent resistance in a second stage of the switching-off cycle but greater than a third equivalent resistance in a third stage of the switching-off cycle;

wherein the drive current circuit is connected with the drive control circuit for controlling the output current to gradually increase to a stable value required by the Darlington transistor, and then maintaining the stable value during the switching-on cycle; and wherein the output current of the drive current circuit increases from a current value I0 to a current value I1 in the first stage of the switching-on cycle and then enters the second stage of the switching-on cycle after reaching the current value I1, and then increases from the current value I1 to a current value I2 in the second stage of the switching-on cycle, and then enters the third stage of the switching-on cycle after reaching the current value I2, and maintains at the current value I2 during the third stage of the switching-on cycle; wherein a current increase rate of the first stage is less than that of the second stage.

2. The Darlington transistor drive circuit according to claim 1, wherein the two switch units are respectively composed of a plurality of switch tubes connected in parallel, and the drive control circuit controls a state of each switch tube of the plurality of switch tubes for defining the equivalent resistance of each switch unit of the two switch units by controlling a number of the plurality of switch tubes which are switched on in each switch unit.

3. The Darlington transistor drive circuit according to claim 2, wherein at least one of the plurality of switch tubes is an NPN-type MOS tube.

4. A constant current switching power supply comprising an input circuit, an output circuit, a transformer, a Darlington transistor and a Darlington transistor drive circuit; wherein a primary input terminal of the transformer is connected to the input circuit, the Darlington transistor is arranged between a primary output end of the transformer and a ground, the output circuit is connected to a secondary side of the transformer;

wherein the Darlington transistor drive circuit comprises:
a drive current circuit connected to a drive pin of the Darlington transistor, used for outputting an output current to the drive pin of the Darlington transistor during a switching-on cycle of the Darlington transistor;

two switch units respectively connected between drive terminals of two transistors of the Darlington transistor and the ground; and a drive control circuit connected with the two switch units, used for controlling the two switch units to be switched off during the switching-on cycle of the Darlington transistor and to be switched on during a switching-off cycle of the Darlington transistor, and for changing an equivalent resistance of the two switch units at different stages during the switching-off cycle of the Darlington transistor; wherein each switch unit of the two switch units has a first equivalent resistance in a first stage of the switching-off cycle which is smaller than a second equivalent resistance in a second stage of the switching-off cycle but greater than a third equivalent resistance in a third stage of the switching-off cycle;

wherein the drive current circuit is connected with the drive control circuit for controlling the output current to gradually increase to a stable value required by the Darlington transistor, and then maintaining the stable value during the switching-on cycle; and wherein the output current of the drive current circuit increases from a current value I0 to a current value I1 in the first stage of the switching-on cycle and then enters the second stage of the switching-on cycle after reaching the current value I1, and then increases from the current value I1 to a current value I2 in the second stage of the switching-on cycle, and then enters the third stage of the switching-on cycle after reaching the current value I2, and maintains at the current value I2 during the third stage of the switching-on cycle; wherein a current increase rate of the first stage is less than that of the second stage.

5. The constant current switching power supply according to claim 4, wherein the two switch units are respectively composed of a plurality of switch tubes connected in parallel, and the drive control circuit controls a state of each switch tube of the plurality of switch tubes for defining the equivalent resistance of each switch unit of the two switch units by controlling a number of the plurality of switch tubes which are switched on in each switch unit.

6. The constant current switching power supply according to claim 5, wherein at least one of the plurality of switch tubes is an NPN-type MOS tube.

7. A Darlington transistor drive method implemented based on a Darlington transistor drive circuit, wherein the Darlington transistor drive circuit comprises:
a drive current circuit connected to a drive pin of a Darlington transistor, used for outputting an output current to the drive pin of the Darlington transistor during a switching-on cycle of the Darlington transistor;

two switch units respectively connected between drive terminals of two transistors of the Darlington transistor and ground; and a drive control circuit connected with the two switch units, used for controlling the two switch units to be switched off during the switching-on cycle of the Darlington transistor and to be switched on during a switching-off cycle of the Darlington transistor, and for changing an equivalent resistance of the two switch units at different stages during the switching-off cycle of the Darlington transistor;

wherein the Darlington transistor drive method comprises implementing following steps repeatedly:
controlling the two switch units to be switched off during the switching-on cycle of the Darlington transistor by the drive control circuit; and controlling the two switch units to be switched on during the switching-off cycle of the Darlington transistor and changing the equivalent resistance of the two switch units at different stages during the switching-off cycle of the Darlington transistor by the drive control circuit; wherein each switch unit of the two switch units has a first equivalent resistance in a first stage of the switching-off cycle which is smaller than a second equivalent resistance in a second stage of the switching-off cycle but greater than a third equivalent resistance in a third stage of the switching-off cycle;

the Darlington transistor drive method further comprises controlling the output current to gradually increase to a stable value required by the Darlington transistor, and then maintaining the stable value during the switching-on cycle by the drive control circuit;

wherein controlling the output current to gradually increase to a stable value required by the Darlington transistor, and then maintaining the stable value during the switching-on cycle by the drive control circuit, further comprises:

increasing the output current of the drive current circuit from a current value I0 to a current value I1 in the first stage of the switching-on cycle;

entering the second stage of the switching-on cycle after the output current reaches the current value I1, and then increasing the output current from the current value I1 to a current value I2 in the second stage of the switching-on cycle, wherein a current increase rate of the first stage is less than that of the second stage; and entering the third stage of the switching-on cycle after the output current reaches the current value I2, and maintaining the output current at the current value I2 during the third stage of the switching-on cycle.

8. The Darlington transistor drive method according to claim 7, wherein the two switch units are respectively composed of a plurality of switch tubes connected in parallel, and the Darlington transistor drive method further comprises defining the equivalent resistance of each switch unit of the two switch units by controlling a number of the plurality of switch tubes which are switched on in each switch unit by the drive control circuit.

* * * * *